S. Lessig,
Horse Rake.
No. 26,599.    Patented Dec. 27, 1859.
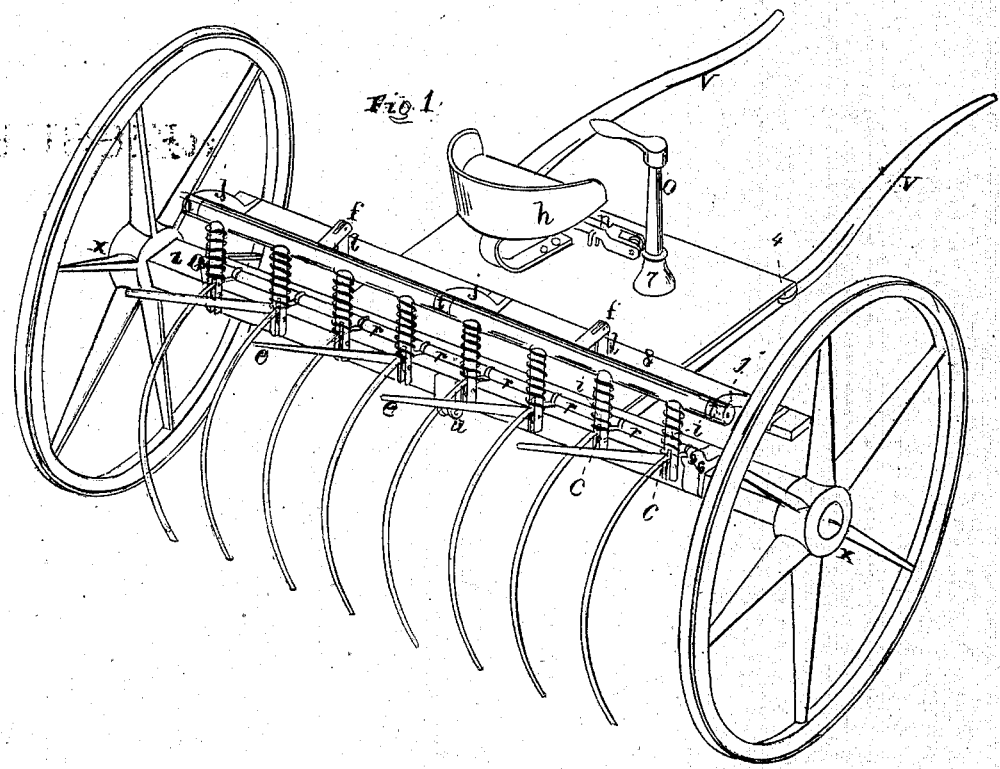
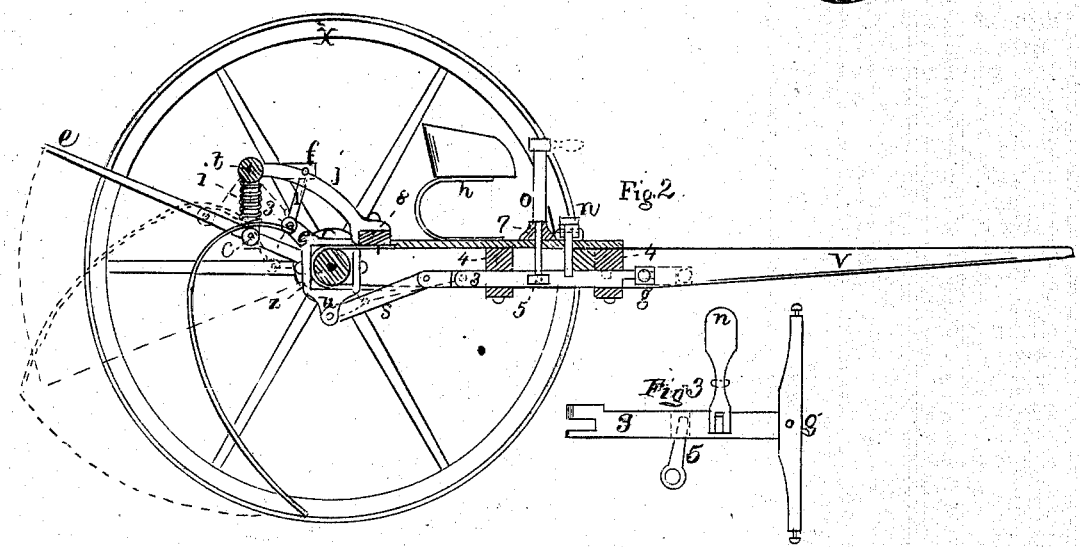

UNITED STATES PATENT OFFICE.

SAMUEL LESSIG, OF READING, PENNSYLVANIA.

IMPROVEMENT IN HORSE HAY-RAKES.

Specification forming part of Letters Patent No. 26,599, dated December 27, 1859.

*To all whom it may concern:*

Be it known that I, SAMUEL LESSIG, of the city of Reading, county of Berks, and State of Pennsylvania, have invented certain new and useful Improvements on a Horse Hay-Rake; and I do hereby declare that the following is a full and exact description thereof, reference being had to the accompanying drawings, and to the letters of reference marked thereon, making a part of this specification, in which—

Figure 1 is a perspective view. Fig. 2 is an elevated longitudinal section, and Fig. 3 is a detailed view of the pulling-bar and its arrangements.

The nature of my invention consists in having an axle, Z, so arranged as to partially revolve, furnished with wheels X X to each end.

V V are thills secured to the axle by means of iron straps 1. (Represented in Fig. 2.)

$w$ is a brace or arm secured to the axle, to which the bar S and sliding bar 3 are connected by means of joints and pins.

4 4 are cross-ties framed into the thills, through which sliding bar 3 has its bearings.

$n$ is a foot-spring, whereby the sliding bar 3 is held firmly and released at pleasure.

O is an upright shaft having its bearings at 7, and is furnished with a handle at the top and crank 5 at the bottom end, which works in a slot in sliding bar 3.

$g$ is a single-tree attached to the end of bar 3, by which means the horse operates the discharge of the hay or grain from the rake.

6 6 are braces or arms secured to the axle Z, to which the rake-teeth are attached by means of an iron bar, 9, passing through the braces and the eye-holes of the teeth.

$r\ r$ are sleeves or ferrules on the bar 9 between the teeth, which secure each and every tooth in its proper place.

8 is a beam secured to the thills.

$j\ j\ j$ are braces secured to beam 8, which carry the vibrating teeth-guides $i\ i$ by means of journals or bearings at $t\ t\ t$. The teeth-guides $i\ i$ are slotted at the lower ends and furnished with rollers $c\ c$, over which and through the guide-slots the curved teeth pass. The guides are operated by means of the arms $f\ f$ and connecting-bars $l\ l$, which form joints at the ends of the arms $f\ f$ and on the tooth-carrying bar 9. The slotted tooth guides are furnished with spiral springs, which fit loosely over the guides and press upon the teeth, by which means each and every tooth has an independent movement when coming in contact with any obstacle, which necessarily would compel one or more of the teeth to spring or rise and pass over the obstacle, while the others will retain the hay or grain which is in the rake.

$e\ e$ are prongs or cleaners secured to the axle Z, which assist in discharging the load from the rake.

In using this rake the operator is seated in seat $h$, and when it is desired to discharge the load he merely presses the foot-spring $n$ down with his foot, which releases the sliding bar and causes it to move forward by the horse pulling thereon, which instantly throws the rake into a discharging position, as represented in dotted lines, Fig. 2. When the load is discharged the operator brings the teeth down by pulling the handle on shaft O toward himself, which brings the sliding bar back, and the foot-latch enters the slot in the sliding bar, and the rake is again ready to proceed.

The principal features and advantages derived in this improvement are having the teeth to work independently by means of the separate spiral springs on the teeth and the operation of the horse discharging or raising the teeth and lowering the prongs or cleaners, which makes it a very useful and efficient machine.

What I claim as my invention, and desire to secure by Letters Patent, is—

The single-tree $g$, sliding bar 3, spring $n$, braces 6, axle Z, bar 9, sleeves $r$, beam 8, braces $j$, slotted teeth-guides $i$, rollers $c$, arms $f$, and connecting-bars $l\ l$, the whole being constructed and arranged for operation conjointly as and for the purpose herein set forth.

SAM. LESSIG.

Witnesses:
 MATTHIAS MENGEL,
 G. S. KINSEY.